(12) United States Patent
Lim

(10) Patent No.: US 8,818,101 B1
(45) Date of Patent: Aug. 26, 2014

(54) APPARATUS AND METHOD FOR FEATURE MATCHING IN DISTORTED IMAGES

(75) Inventor: Jongwoo Lim, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 319 days.

(21) Appl. No.: 13/342,644

(22) Filed: Jan. 3, 2012

(51) Int. Cl.
*G06K 9/46* (2006.01)
*G06K 9/36* (2006.01)
*G06K 9/32* (2006.01)
*G09G 5/00* (2006.01)
*H04N 7/00* (2011.01)

(52) U.S. Cl.
USPC .......... 382/190; 382/195; 382/276; 382/277; 382/284; 382/293; 382/294; 345/629; 345/648; 348/36; 348/39

(58) Field of Classification Search
None
See application file for complete search history.

(56) References Cited

U.S. PATENT DOCUMENTS

| | | | |
|---|---|---|---|
| 6,192,393 B1* | 2/2001 | Tarantino et al. | 709/203 |
| 6,393,162 B1* | 5/2002 | Higurashi | 382/284 |
| 6,466,254 B1* | 10/2002 | Furlan et al. | 348/36 |
| 6,486,877 B1* | 11/2002 | Watanabe | 345/420 |
| 6,486,908 B1* | 11/2002 | Chen et al. | 348/39 |
| 6,711,293 B1 | 3/2004 | Lowe | |
| 7,400,782 B2* | 7/2008 | Zhou et al. | 382/284 |
| 7,409,105 B2* | 8/2008 | Jin et al. | 382/284 |
| 7,426,317 B2* | 9/2008 | Nielsen | 382/284 |
| 7,899,270 B2* | 3/2011 | Kim et al. | 382/284 |
| 8,049,786 B2* | 11/2011 | Pan et al. | 348/218.1 |
| 8,385,689 B2* | 2/2013 | Chandrashekar et al. | 382/294 |
| 8,391,640 B1* | 3/2013 | Jin | 382/284 |
| 2006/0158730 A1 | 7/2006 | Kira | |
| 2007/0031062 A1 | 2/2007 | Pal | |
| 2011/0109720 A1 | 5/2011 | Smolic | |

FOREIGN PATENT DOCUMENTS

| | | |
|---|---|---|
| CN | 101673394 A | 3/2010 |
| JP | 2008061260 A | 3/2008 |
| WO | 2006112927 A2 | 10/2006 |

OTHER PUBLICATIONS

Tordoff et al., "The Impact of Radial Distortion on the Self-Calibration of Rotating Cameras", Computer Vision and Image Understanding, vol. 96 No. 1, Oct. 2004, pp. 17-34.*

Foote, Jonathan, "FlyCam—Practical Panoramic Video and Automatic Camera Control", IEEE, 2000.

Brown, Matthew, et al., "Automatic Panoramic Image Stitching Using Invariant Features",Department of Computer Science, University of British Columbia, 2007, Vancouver, Canada. (16 pages).

(Continued)

*Primary Examiner* — Tom Y Lu
*Assistant Examiner* — Jose M Torres
(74) *Attorney, Agent, or Firm* — Lerner, David, Littenberg, Krumholz & Mentlik, LLP

(57) ABSTRACT

Provided is a method of processing images. The method may include obtaining a plurality of radially-distorted images captured from one location in different directions, the plurality of images each having a field of view, and neighboring images among the plurality of images having overlapping fields of view. The method may further include reducing relative distortion of portions of the neighboring images in the overlapping fields of view of the neighboring images, matching features between the reduced distortion portions of neighboring images in the overlapping fields of view, and storing in memory data indicative of matched features.

20 Claims, 10 Drawing Sheets

(56) References Cited

OTHER PUBLICATIONS

Brown, Matthew, et al., "Recognising Panoramas", Department of Computer Science, University of British Columbia, 2001, Vancouver, Canada. (8 pages).

Frahm, Jan-Michael, et al., "3D Reconstruction of Architectural Scenes from Uncalibrated Video Sequences," available via the Internet at http://www.cs.unc.edu/~rraguram/papers/3darch09.pdf, accessed on Aug. 8, 2011, pp. 1-7.

AutoStitch: a new dimension in automatic image stitching, available via the Internet at http://www.cs.bath.ac.uk/brown/autostitch/autostitch.html, Aug. 4, 2011, pp. 1-11.

"Scale-invariant feature transform" (from Wikipedia), available via the Internet at http://en.wikipedia.org/wiki/Scale-invariant_feature_transform, Dec. 24, 2011, pp. 1-16.

"SURF" (from Wikipedia), available via the Internet at http://en.wikipedia.org/wiki/SURF, Dec. 15, 2011, pp. 1-6.

* cited by examiner

APPARATUS AND METHOD FOR FEATURE MATCHING IN DISTORTED IMAGES

BACKGROUND OF THE INVENTION

1. Field of the Invention

The present invention relates generally to image processing and, more specifically, to feature matching in distorted images.

2. Description of the Related Art

Images often include features, or regions of an image that have some property that makes a region of the image noteworthy for certain purposes. The features may be edges, curves, points, two-dimensional shapes, or other regions, and the features typically arise from the scene depicted in the image. Depending on what is depicted in the image, the features may be features arising from the depiction of objects in the image, for example corners of furniture, edges of walls, facial features of people, or other visible items, or in other examples, the features may arise from phenomena created by such objects, for example shadows, glare, lights, and the like.

Images often have features that are machine recognizable. For example, a tennis racket appearing in an image may produce a number of features, such as edges of the handle, edges of the strings, a shadow from the racket on a table, and a glare from the racket, and an image-processing machine, such as a properly programmed computer, may detect those features. The detected features may be used for a number of purposes. For instance, the image-processing machine may be configured to identify objects appearing in images based on correlations between the features identified in the image and features stored in memory associated with other images of a given item. In another example, the image-processing machine may be configured to match features appearing in two different images and align the two different images with one another based on the matched features or examine differences between the appearance of the same feature in two different images, e.g., to identify attributes of the environment in which the two images were captured, such as differences in camera position or differences in the behavior of light passing through different regions of a camera lens.

Matching features between images that are distorted is often difficult. For instance, spatial distortion often changes the spacing between, and relative size of, the features of the same object appearing in differently distorted portions of images, e.g., based on where the features appear within an image. For instance, features appearing near a left edge of an image may be distorted such that the features are reduced in size in the image and appear smaller relative to features near the center of the image that are, in the scene being imaged, the same size. Distorting the relative size and spacing of the features within an image, particularly when the distortion is based on where those features appear within an image, often impedes efforts to match similar features appearing in other images in which the features are not distorted or other images in which the features are distorted in a different way, e.g., in a different portion of another distorted image.

SUMMARY OF THE INVENTION

The following summary is not a comprehensive characterization of all aspects of the present invention.

In some aspects, the present techniques include a method of processing images. The method may include obtaining a plurality of radially-distorted images captured from one location in different directions, the plurality of images each having a field of view, and neighboring images among the plurality of images having overlapping fields of view. The method may further include reducing relative distortion of portions of the neighboring images in the overlapping fields of view of the neighboring images, matching features between the reduced distortion portions of neighboring images in the overlapping fields of view, and storing in memory data indicative of matched features.

Some aspects include a non-transitory tangible machine-readable memory having a computer program product stored thereon that causes the computer to do the following: obtaining a plurality of radially-distorted images captured from one location in different directions, the plurality of images each having a field of view, and neighboring images among the plurality of images having overlapping fields of view; reducing relative distortion of portions of the neighboring images in the overlapping fields of view of the neighboring images; matching features between the reduced distortion portions of neighboring images in the overlapping fields of view; and storing in memory data indicative of matched features.

Some aspects include a system that includes one or more processors and one or more memories communicatively coupled to the one or more processors and storing instructions that when executed by one or more of the one or more processors cause the following to occur: obtaining a plurality of radially-distorted images captured from one location in different directions, the plurality of images each having a field of view, and neighboring images among the plurality of images having overlapping fields of view; reducing relative distortion of portions of the neighboring images in the overlapping fields of view of the neighboring images; matching features between the reduced distortion portions of neighboring images in the overlapping fields of view; and storing in memory data indicative of matched features.

BRIEF DESCRIPTION OF THE DRAWINGS

The above-described aspects of the present invention and other aspects will be better understood when the present disclosure is read in view of the following figures, in which like numbers indicate similar or identical elements.

Figure 1:
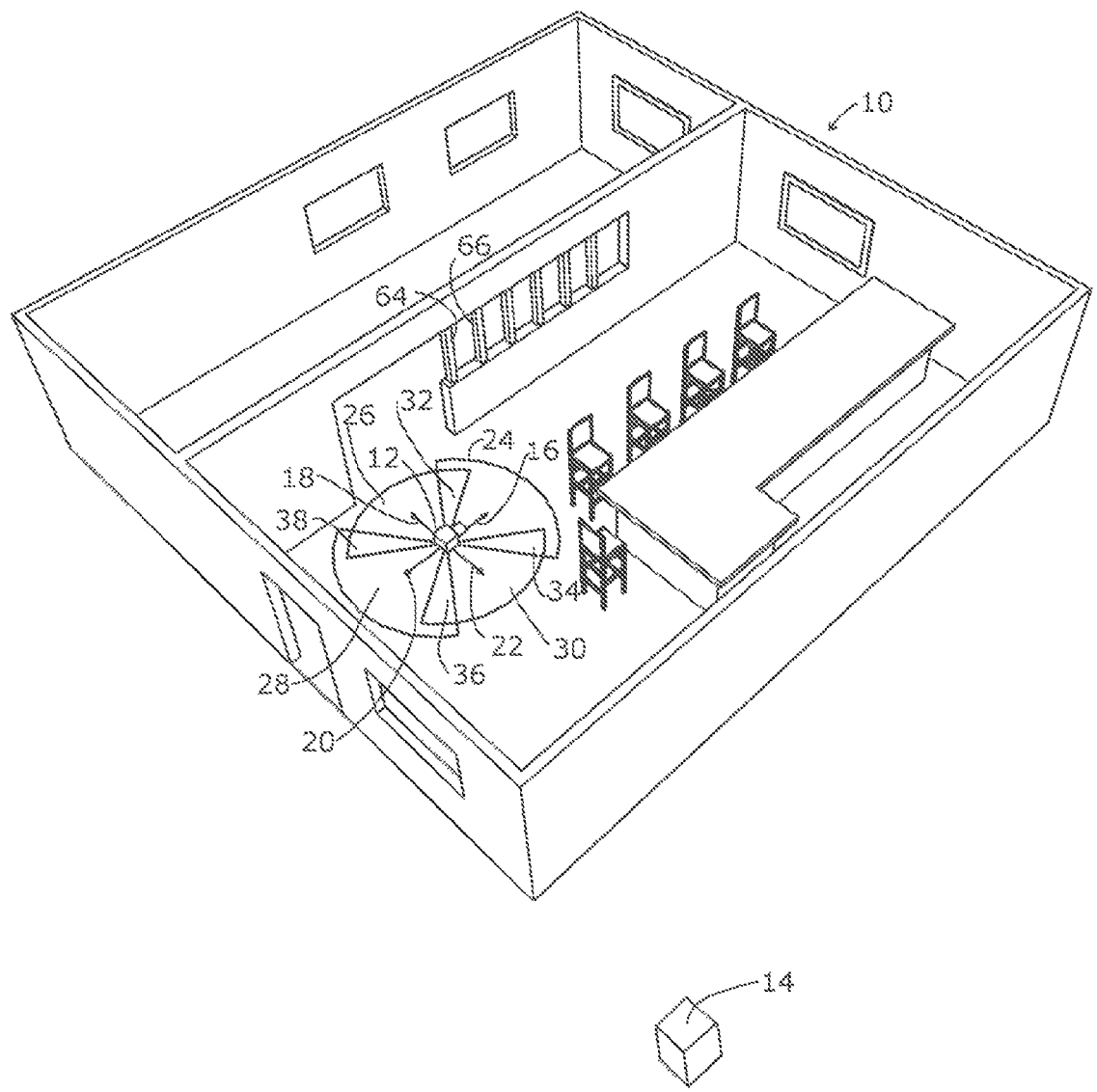
FIG. 1 illustrates embodiments of a camera, an image-feature matcher, and a sectioned indoor space.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 illustrates an example of an indoor space 10 being photographed by a camera 12 operable to capture distorted images of the indoor space 10 and convey those distorted images to an image-feature matcher 14. The camera 12, as explained in greater detail below with reference to FIG. 2, in some embodiments, may capture radially-distorted images, such as barrel distorted images captured through a wide-angle lens, e.g., a fisheye lens. These distorted images may be conveyed (e.g., stored and transmitted or transmitted) to the image-feature matcher 14, which as explained below in greater detail with reference to FIGS. 3-8, may be configured to match features appearing in different images by reducing distortion in overlapping portions of the images and, then, matching features in the reduced distortion portions of the images.

As discussed below, the matched features may be useful for a variety of purposes, including stitching the distorted images to one another, thereby in some embodiments, forming a panorama of the indoor space 10, for example a 360-degree horizontal panorama of the indoor space 10, an example of which may be displayed by a user viewing a mapping service described below with reference to FIG. 9. Not all embodiments necessarily provide this benefit, however, and some embodiments may provide other benefits, some of which are described below. The operation and features of the image-feature matcher 14 will be described in greater detail after describing the operation of the camera 12.

The illustrated camera 12 may be a variety of different types of camera. For example, the camera 12 of this embodiment is a digital single lens reflex (SLR) still camera, but other embodiments may have other types of cameras, such as other types of still cameras, like a point-and-shoot, a cell-phone camera, or a web-cam. In some embodiments, the camera 12 may be a video camera. The camera 12 of this embodiment is configured to capture images of light in the visible portion of the electromagnetic spectrum, but other embodiments may include cameras 12 operable to capture images of electromagnetic radiation in other frequency ranges, e.g., infra-red images.

The camera 12 may be mounted to a tripod or other support operable to hold the camera 12 relatively steady at a location within the indoor space 10 while the camera 12 is oriented in different directions. In some embodiments, the support may be mounted to the camera 12 with a single degree of freedom, or more degrees of freedom, for example two or three. The camera 12 may be mounted to the support such that the camera 12 is operable to rotate about a vertical axis and horizontally pan around the indoor space 10 to user-selectable orientations. In some embodiments, the support may include notches or other structures that establish preferred orientations of the camera 12 relative to the support. For example, the camera 12 may be operable to rotate to a number of radially symmetric orientations, or other combinations of different directions, at a given location within the indoor space 10.

In the illustrated embodiment, the camera 12 is configured to be oriented in four different directions 16, 18, 20, and 22. For example, the directions 16, 18, 20, and 22 may be indicated by preferred orientations established by the above-mentioned notches or other structures, or as indicated by visible marks. The illustrated directions are each approximately 90-degrees apart from the adjacent directions, or neighboring directions, but in other embodiments, the camera 12 and its support may be operable to preferentially orient the camera 12 in more or fewer orientations than those shown in FIG. 1. The illustrated directions 16, 18, 20, and 22 are generally perpendicular to the vertical axis about which the camera 12 is operable to rotate, but in other embodiments, the directions 16, 18, 20, 22 may be at some other angle with respect to this axis.

The illustrated camera 12 may include a wide-angle lens or other lens that spatially distorts images relative to a rectilinear representation of a scene. For example, in some embodiments, the camera 12 includes a full-frame 35 mm format image sensor, and the lens may have a focal length substantially less than 50 mm, for example less than or approximately equal to 35 mm, 28 mm, 24 mm 21 mm, 20 mm, 14 mm, and in some embodiments, the lens may be a fish-eye lens, for example a lens having a focal length of less than or equal to approximately 12 mm, 8 mm, or 6 mm.

The lens of the camera 12 and the camera 12 may cooperate to establish a field of view of images captured by the camera 12. The field of view may include a horizontal component and a vertical component. For instance, in some embodiments in which the camera 12 is oriented in a landscape mode, the horizontal field of view may be wider than the vertical field of view, or in portrait mode, the horizontal field of view may be smaller than the vertical field of view. The portion of the indoor space 10 that appears within the field of view of the camera 12, in this embodiment, depends on the orientation of the camera 12. The field of view of the camera 12 while oriented in direction 16 is identified by reference numeral 24; the field of view of the camera 12 while oriented in direction 18 is identified by reference numeral 26; the field of view of the camera 12 while oriented in direction 20 is identified by reference numeral 28; and the field of view of the camera 12 while oriented in direction 22 is identified by reference numeral 30. Thus, which portion of the indoor space 10 is depicted in an image captured by the camera 12 depends on the direction in which the camera 12 is pointing, and those portions of the indoor space 10 visible within the field of view of the camera 12 in that direction will generally be depicted. The field of view may be generally rectangular, oval, circular, or have some other shape.

The number of directions in which the camera 12 is oriented may be selected based on the size of the field of view of the camera 12. For example, the angular distance between each of the directions 16, 18, 20, and 22 may be less than the horizontal field of view of the camera 12. As a result, the field of view in different directions, in this embodiment, overlaps: the field of view 24 in direction 16 overlaps with the field of view 26 in direction neighboring direction 18 in the region identified by reference numeral 32; and the field of view in direction 16 also overlaps with the field of view 30 in direction 22 in the region identified by reference numeral 34. Similarly, the other field of view that neighbors field of view 30 in direction 22 is field of view 28 in direction 20, and these fields of view 28 and 30 overlap in the region identified by reference numeral 36. And the other field of view neighboring field of view 26 in direction 18 is field of view 28 in direction 20, and these fields of view 26 and 28 overlap in the region identified with reference numeral 38.

Each of the directions 16, 18, 20, and 22 may bisect their respective corresponding fields of view 24, 26, 28, and 30. Further, the directions 16, 18, 20, 22 may be parallel to an optical axis of the camera 12 when the camera is oriented in each of these respective directions, for example the optical axis of the camera 12 may be parallel to and vertically aligned with each of the directions 16, 18, 20, and 22 when the camera is oriented in those directions. The optical axis may lie in the center of each field of view when the camera 12 is oriented in the corresponding fields of view 24, 26, 28, and 30.

In operation, the camera 12 may first be positioned within the indoor space 10, and information about the indoor space 10 may be recorded, for example in memory of the camera 12 or in some other repository for data, for example a handheld mobile device, a tablet computer, or other device, such as the other examples of a computing device described below with reference to FIG. 10. In some embodiments, an identifier of the indoor space 10, the location of the indoor space, and the position of the camera 12 within the indoor space 10 may be recorded in memory of the device.

The camera 12 may then be oriented in one of the directions, for example direction 16, and the camera 12 may capture an image of the indoor space 10 appearing within the field of view 24. In some embodiments, multiple images may be captured while the camera 12 is oriented in direction 16 with different image settings. For example, an exposure time of the camera 12 may be varied between the different images. In some embodiments, three images may be captured in each orientation 16, 18, 20, 22 (12 images total), and each of the three images at each orientation may have a different exposure time (e.g., duration or exposure setting). The camera 12 may have an image sensor, such as a complimentary metal oxide semiconductor (CMOS) image sensor or charge-coupled device (CCD) sensor, having a finite dynamic range, and light-sensitive elements of the image sensor that receive an amount of light above or below that dynamic range may not record attributes of the image beyond those boundaries. Accordingly, in some embodiments, the image exposed with a relatively short exposure time may be an image in which portions of the indoor space 10 that are relatively bright, such as lights or glare, remain within the dynamic range of the image sensor of the camera 12, and the image exposed for a relatively long exposure time may be an image in which portions of the indoor space that are relatively dim, such as shadows and corners, remain within the dynamic range of the sensor of the camera 12. In other embodiments, more or fewer images may be captured, for example, a single image may be captured in each direction.

After capturing the images in direction 16, the camera 12 may be rotated in another direction, such as direction 18. A mechanical indicator, such as a notch or other structure, like magnets, cams, ridges, etc., may indicate to an operator when the camera 12 has reached direction 18 when rotating the camera 12. Once in direction 18, the above-described process that was performed in direction 16 may be repeated, and for example, three images at three different exposure times may be captured in direction 18. The camera 12 may then be rotated to direction 20, and this process may be repeated again, thereby acquiring three additional images at different exposure times. The camera 12 may be rotated once more to direction 22, where three more images may be captured.

In some embodiments, in each of the directions 16, 18, 20, and 22, the camera 12 may be angled up or down, and additional images may be captured. For instance in indoor spaces 10 in which the vertical field of view of the camera 12 does not capture as much of the indoor space as is desired, images at an upward tilting angle and downward tilting angle may be captured. Further, in some embodiments, the camera 12 may be positioned higher or lower within the indoor space 10 at a given location, and the above-described process in which images were captured may be repeated, for example at a floor-height view, at an eye-level view, and at a ceiling-level view. In some embodiments, one or more of these processes may be repeated at different locations within the indoor space 10, and an additional set of images from different locations may be captured.

The captured images may be stored in memory of the camera 12 and transmitted, for example via a wireless interface of the camera 12 or via a wired interface, to the image-feature matcher 14, which as described below, may match features appearing in the overlapping portions 32, 34, 36, and 38 of the neighboring field of view 24, 26, 28, and 30. The resulting matched features, as explained below, may be used to stitch the images captured in each of the directions 16, 18, 20, 22 together to form a panorama, such as a 360-degree horizontal panoramic cylindrical projection of the indoor space 10 as perceived by a person standing in the location of camera 12. Before describing this matching and stitching process in greater detail, aspects of the captured images are described with reference to FIG. 2.

Figure 2:
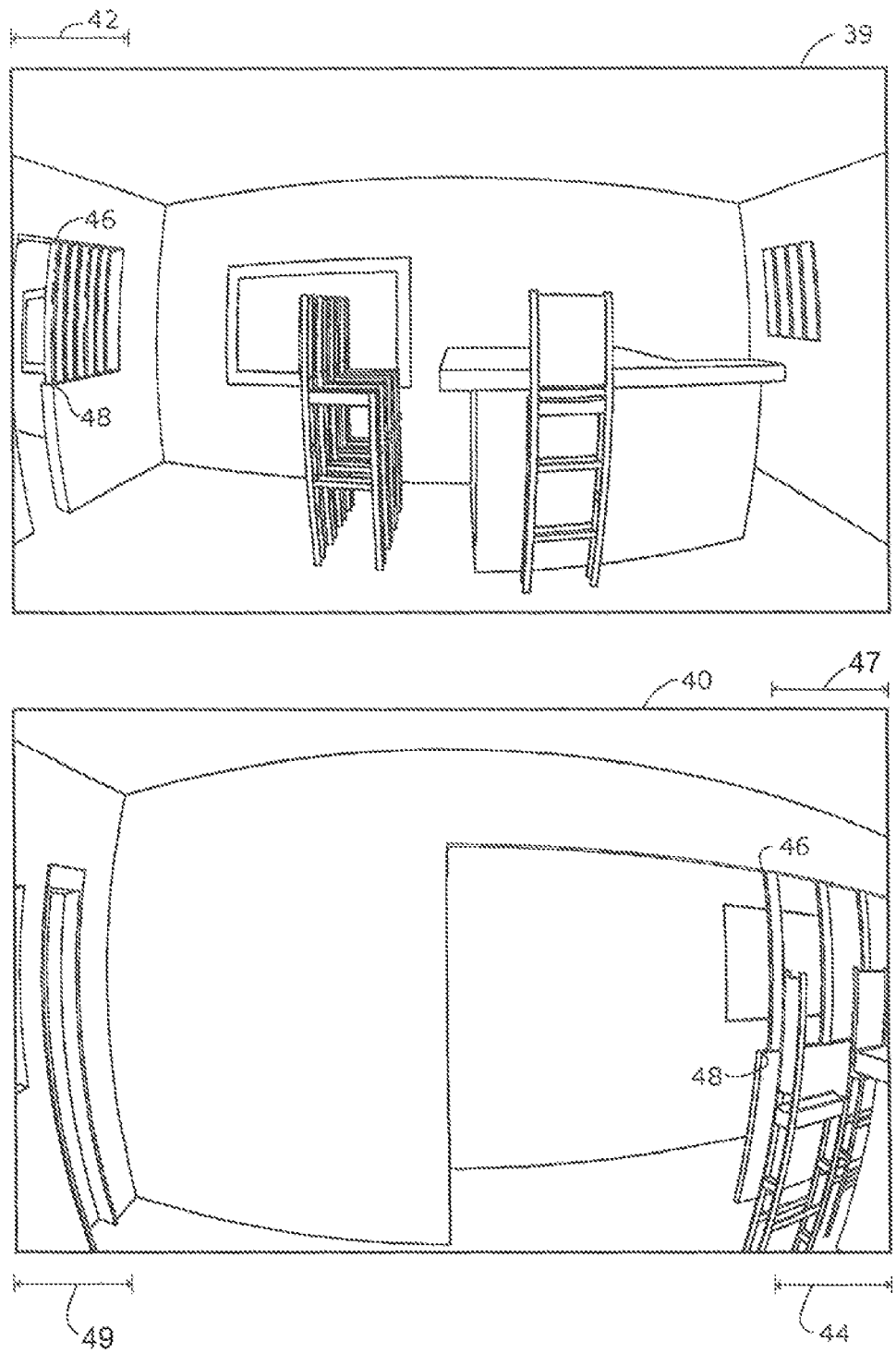
FIG. 2 illustrates examples of spatially-distorted images captured in the indoor space of FIG. 1 with the camera of FIG. 1.

FIG. 2 illustrates an exemplary image 39 captured in direction 16 (FIG. 1) and an exemplary image 40 captured in direction 18. The illustrated images 39 and 40 are each spatially distorted. In this embodiment, the images 39 and 40 are distorted by a fisheye lens of the camera 12. The distortion may magnify different portions of each image 39 and 40 differently depending on where those portions fall within the field of view of the camera 12. For instance, in this embodiment, the magnification of regions of the images 39 and 40 near the edges of the images 39 and 40 is lower than a magnification of regions of the images 39 and 40 near the center of the images 39 and 40. In some embodiments, the magnification may vary as a function of the distance (for example an angular distance) of a feature in the images 39 and 40 to an optical axis of the camera 12 when capturing the images 39 and 40. In some embodiments, the distortion of the images 39 and 40 may be characterized as barrel distortion, which may cause objects with vertical straight lines in the indoor space 10 to appear curved if those objects appear near an edge of the images 39 or 40. For example, the curvature of a vertical feature near a left edge portion 42 of the image 39 may be curved about a point to the right, and a vertical feature appearing in a right portion of the image 40 may appear curved about a point to the left. Thus, the same feature may be distorted differently in the two different images 39 and 40.

In this embodiment, as indicated by the overlapping portion 32 (FIG. 1) of fields of view 24 and 26, the left portion 42 of image 39 overlaps with the right portion 44 of image 40. Consequently, in some embodiments, features appearing in the left portion 42 of image 39 also appear in the right portion 44 of image 40. However, in some instances, it is difficult to match those features (i.e., match the features by processing the images with a computing device configured to identify matching features) because the left portion 42 of image 39 is distorted differently from the right portion 44 of image 40. The size, relative spacing, and other attributes of the same features in each of the images 39 and 40 are different because of the distortion. For example in image 39, a top corner 46 of a pillar is to the right of a bottom corner 48 of the same pillar, but in image 40 the same top corner 46 appears to the left of the bottom corner 48. The differing distortions in the different images 39 and 40 often impede the matching of features between the images 39 and 40 and makes it difficult to stitch image 39 to the right of image 40 to form a single composite image (or collection on images) spanning both fields of view 24 and 26 (FIG. 1).

A similar phenomenon occurs in the right portion 47 of image 39 relative to a left portion of the image captured in direction 22 falling within the overlapping region 34 and in the left portion 49 of image 40 relative to the right portion of the image captured in direction 20 falling in the region of the overlapping fields of views 38 (FIG. 1). The features in these regions are differently distorted, and consequently, are often difficult to match.

Figure 3:
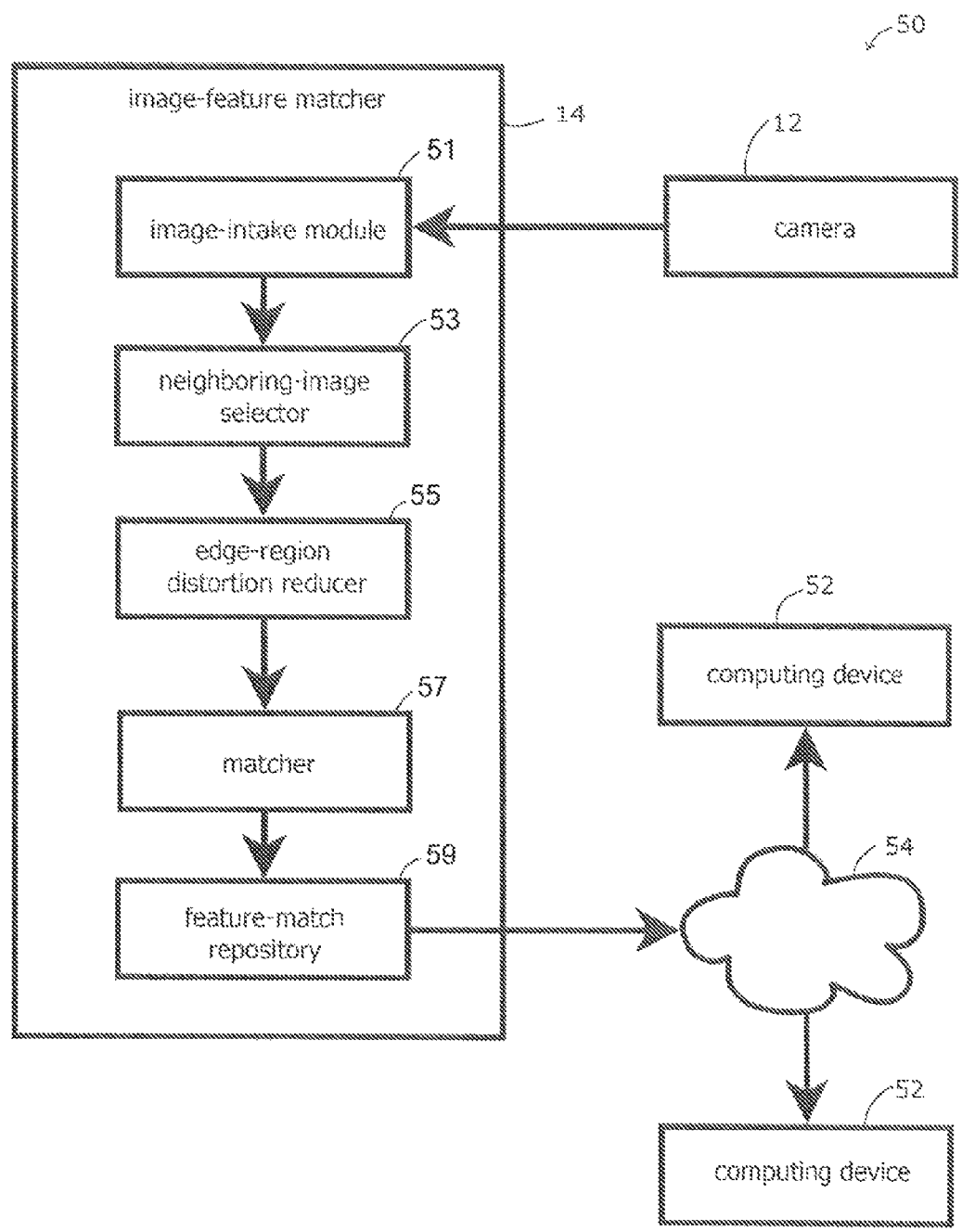
FIG. 3 illustrates an example of the image-feature matcher of FIG. 1.

FIG. 3 illustrates an example of a system 50 for capturing and processing distorted images, such as the spatially distorted images described above. In this embodiment, the system 50 includes the camera 12 and the image-feature matcher 14 discussed above and computing devices 52 and network 54. As explained below, the image-feature matcher 14, in some embodiments, may be configured to receive or otherwise obtain images from the camera 12, match features appearing in overlapping portions of those images, store the resulting matches, and transmit data indicative of those matches to the other computing devices 52 via the network 54.

The image-feature matcher 14 may be a computing system, such as a computing device (e.g., the computing device described below with reference to FIG. 10), a computing device operating as a server in a client-server computing system, or a computing device operating as a peer in a peer-to-peer computing system. The image-feature matcher 14 may include one or more processors communicatively coupled to one or more memories, either of which may be distributed geographically, distributed at a single location, or disposed within a single device, such as a rack of a server or a desk-top computer, for example. In some embodiments, the image-feature matcher 14 may be or may include virtual machines or standalone applications that operate in a computing system in which other virtual machines or other standalone applications operate.

In this embodiment, the image-feature matcher 14 includes an image-intake module 51, a neighboring-image selector 53, an edge-region distortion reducer 55, a matcher module 57, and a feature-match repository 59. The illustrated functional blocks 51, 53, 55, 57, and 59 may be embodied in whole or in part as hardware, for example a field programmable gate array or an application-specific integrated circuit, or in whole or in part as software executing on one or more of the above-mentioned processors and stored on one or more of the above-mentioned memories. The functional blocks 51, 53, 55, 57, and 59 are described as discrete and separate functional blocks, but in some embodiments, structures or code by which these blocks are implemented may be intermingled or otherwise organized in different groupings than those illustrated.

The illustrated image-intake module 51 may be operable to listen to a port of the image-feature matcher 14, such as a virtual port, like a TCP/IP port, or a physical port, such as a universal serial bus (USB) port, and receive images from the camera 12. The received images may be those images described above. In some embodiments, the received images may be stored in memory, and a user may select the stored images for further processing, or in certain embodiments, the functions of the other modules may be initiated in response to receiving the images from the camera 12.

The images may be transmitted to the neighboring-image selector 53 from the image-intake module 51. The transmission, like the other transmissions between modules described herein, may occur through reference to a variable pointing to portions of memory, by passing a copy of the value stored in memory to a new portion of memory, or through other techniques, such as transmitting data in electrical signals over a data bus within a computer or over a network between processors in a distributed computing system.

The neighboring-image selector 53 may identify images that neighbor one another. Neighboring images have an overlapping field of view. In some embodiments, the identification of neighboring images may be based on the sequence in which images are obtained, for example the images may be obtained or transmitted in the order in which they were captured in a clockwise or counterclockwise direction, or the identification of neighboring images may be based on image file names, for example the image filename may identify the direction in which images captured. In another example, neighboring images may be identified by a data structure having the images as an attribute, for instance a panorama-input object may have image objects as attributes, and each of those image objects may have as an attribute an orientation of the image or a pointer to a left neighbor object and a right neighbor object. (Or some embodiments may include an upper and lower neighbor object.) In some embodiments, neighboring images may be identified by a user manually, and user input signals identifying neighboring images may be received by the neighboring-image selector 53. The neighboring-image selector may output pairs of neighboring images, and in some embodiments, each image may be output twice, once as a pair with its neighbor to the left, and once as a pair with its neighbor to the right. (Or in embodiments also having neighboring images above and below, each image may be output four times, once for each neighboring image.) The neighboring pairs may be output with data indicating the overlapping direction of each image, e.g., a value indicating whether each image in the pair overlaps with its neighbor to the left or the right of that image.

Each neighboring pair transmitted by the neighboring-image selector 53 may be received by the edge-region distortion reducer 55, which may transform each image in the neighboring pair such that the distortion of the overlapping portion of each image in the pair is reduced or such that the distortion in this portion of each image is more similar than in the input images. In some embodiments, the transformation may be based on the value indicating the overlapping direction of each image. Examples of a transformation that reduces the distortion in the relevant edge regions of each image in the neighboring pair is described below with reference to FIGS. 4-6. The edge-region distortion reducer may output a pair of images each having a region of reduced distortion, and those regions of reduced distortion may be on opposing sides of the pair of images, in the region in which the pair of images overlap.

The pair of images with regions of reduced distortion may be received by the matcher module 57, which may match features appearing in the pair of images having reduced distortion. In some embodiments, the matcher 57 may match features with a process described in greater detail below with reference to FIG. 8. The matched features may be expressed in a variety of formats. For example, the matched features may be expressed in the coordinate system, for instance in rows and columns of pixels, of the images with regions of reduced distortion. In some embodiments, each matched feature may be expressed as a pair of vectors, each vector in the pair identifying the location of the matched feature in one of the pair of images. In certain embodiments, matched features may be expressed as matching regions or matching lines, which themselves may be expressed as the above described pairs of vectors or in other formats. Some embodiments may identify the matching features in the coordinate system of the input images received at the image-intake module 51. For example, to this end, the transformation performed by the edge-region distortion reducer 55 may be reversed and applied to the vectors describing the matched features in the images with regions of reduced distortion.

In some embodiments, each matched feature may be associated with other data about the match. For example, the vectors or other data describing the location of the matched feature may be associated with an identifier, such as an identifier number incremented or decremented as each match is identified; a match confidence indicator, indicating a strength of the match, for example a percentage confidence that the identified matches are an actual match; or (i.e., and/or) a matched technique identifier indicating an algorithm used to identify the match in instances in which multiple algorithms are used to identify matches in a pair of images. The matches may also identify the images in which the matches are made, for example a relative identifier indicating that a match is to an image to the left or to the right of a neighboring pair, or an absolute identifier naming the match by a filename of the image or other unique image identifier.

The matcher module 57 may transmit the identified matches to the feature-match repository 59 (e.g., a data store), which may store the identified matches in memory, e.g., a tangible machine readable non-transitory memory, such as dynamic or persistent memory of a computing device, for instance in database; a document; as attributes of an object; or some other form of structured or unstructured data. The identified matches may be associated with (e.g., in the above-described memory) the images in which the matches were made, and the above described data relating to the matches may also be associated with the images and the corresponding matches. The feature-match repository 59 may be operable to output the matches to computing devices 52 via the network 54, and the computing devices 52 may use the matches in a variety of ways, some of which are described below.

In some embodiments, the computing devices 52 are operable to stitch the images to one another based on the matches obtained from the feature-match repository 59. The image-feature matcher 14 or computing devices 52 may include a stitcher module communicatively coupled to the feature-match repository 59 and configured to perform the stitching operations described herein. For example, the images may be stitched to one another in a cylindrical projection or other projection to form a panorama having a field of view larger than any one of the images from which the panorama is constructed. For instance, in some embodiments, the panorama may have a 360-degree horizontal field of view.

In certain embodiments, the lens on the camera 12 (FIG. 1) may be characterized based on (e.g., exclusively based on or non-exclusively based on) matches obtained from the feature-match repository 59. For instance, differences in the way in which the features are distorted (e.g., different magnifications) in different portions of different images is indicative of the shape of the lens on the camera 12. Attributes of the lens, such as focal length, center of projection, or radial distortion, may be estimated based on differences in locations, sizes, or spacing of the matches or other attributes of the matches between different images and the locations of those matches in the different images. In some embodiments, the above-described transform for reducing distortion may be refined based on the estimated lens parameters. In some embodiments, the obtained images may be transformed based on the estimated attributes of the lens such that the obtained images have reduced distortion relative to the captured images. For example, an amount of magnification in a region of an image may be estimated based on the relative distance between matches in differing images, and the image may be transformed to normalize the amount of magnification across the entire image based on the estimated amount of magnification. An example of such a normalization transformation is described below with reference to FIG. 6.

In some embodiments, the computing devices 52 may be part of a geographic information service (GIS) or a mapping service (which is not to suggest that some GISs do not provide mapping services or that some mapping services do not also provide geographic information), such as a web mapping service, examples of which are described below with reference to FIG. 9. The GIS may include one or more servers operable to transmit interactive maps to client devices, which may display the interactive maps on displays of the client devices, e.g., in a web browser or a special-purpose application. In some embodiments, the stitched panoramas may be selected on client devices by receiving, on the client device, user inputs requesting that the interactive map navigate to a building in which the stitched panoramas were taken; transmitting data indicative of the building to the client device, the transmitted data including an interface for the user to select a panorama of the interior of the building. In some embodiments, the stitched panorama may be viewed in a user's browser, for instance, a user request to view the panorama may be received by the client device and transmitted to the GIS, and in response, the GIS may retrieve the stitched panorama and transmit the panorama to the client device, which may, in response, display the panorama. In some embodiments, a user may interact with the stitched panorama, for example by clicking touching or otherwise indicating a desire to view a different portion of the panorama, for instance to shift the panorama in the browser's viewport clockwise or counterclockwise, and a corresponding image portion of the panorama may be transmitted and displayed in accordance with the request.

Figure 4:
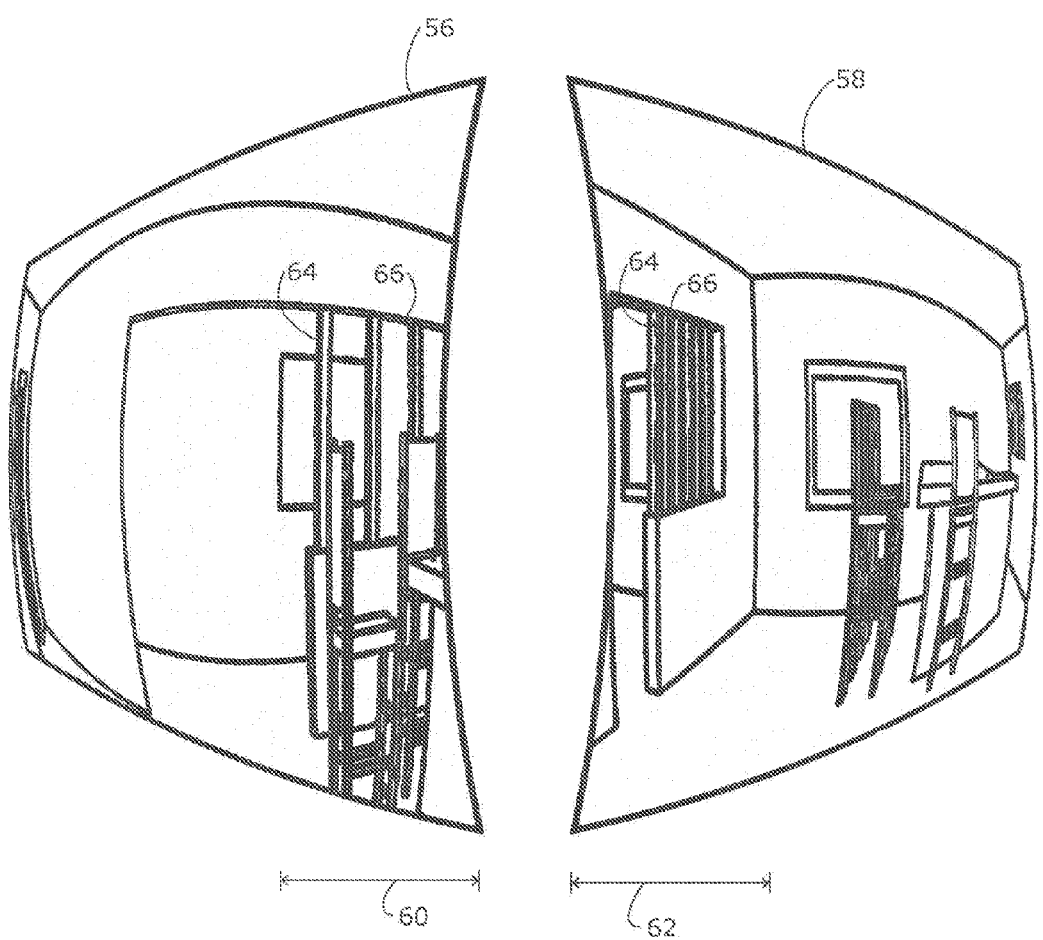
FIG. 4 illustrates the images of FIG. 2 after transforming the images to reduce distortion in edge regions of the images.

FIG. 4 illustrates examples of images 56 and 58 that may be output by the edge-region distortion reducer 60 of FIG. 3. The images 56 and 58, in some embodiments, may not be rendered on a display screen as part of some of the image processing techniques described herein, and, in some embodiments, may exist only in memory. Or, in some embodiments, the images 56 and 58 may be displayed, for example to a user to indicate progress. The image 56 of FIG. 4 is a transformation of the image 40 of FIG. 2, and the image 58 of FIG. 4 is a transformation of the image 39 of FIG. 2. The illustrated transformations transform all or substantially all of the data in each of the images 39 and 40 of FIG. 2, but in other embodiments, the transformation may include transforming only a portion of the images 39 and 40, for example the overlapping portion of the fields of view of the images 39 and 40 lying in the left edge region 42 of image 39 and the right edge region 44 of image 40, as illustrated in FIG. 2.

In this embodiment, the transformation includes reducing distortion in a right region 60 of image 56 and in a left region 62 of image 58. As a result, in this example, features that exhibit generally vertical straight lines in the indoor space 10 (FIG. 1), such as the pillar 64, appear as generally straight or straighter vertical lines in the transformed images 56 and 58 of FIG. 4 relative to the appearance of those features in FIG. 2. Further, in some embodiments, generally straight horizontal lines exhibited by features in the indoor space 10, such as edge 66, may appear as generally straight lines in the right edge portion 60 of image 56 and in the left edge portion 62 of image 58. In some embodiments, the edge regions 60 and 62 may approximate a rectilinear representation of the features in the indoor space 10, a representation in which features that are substantially straight lines in the indoor space 10 appear as substantially straight lines in the edge regions 60 and 62.

Figure 5:
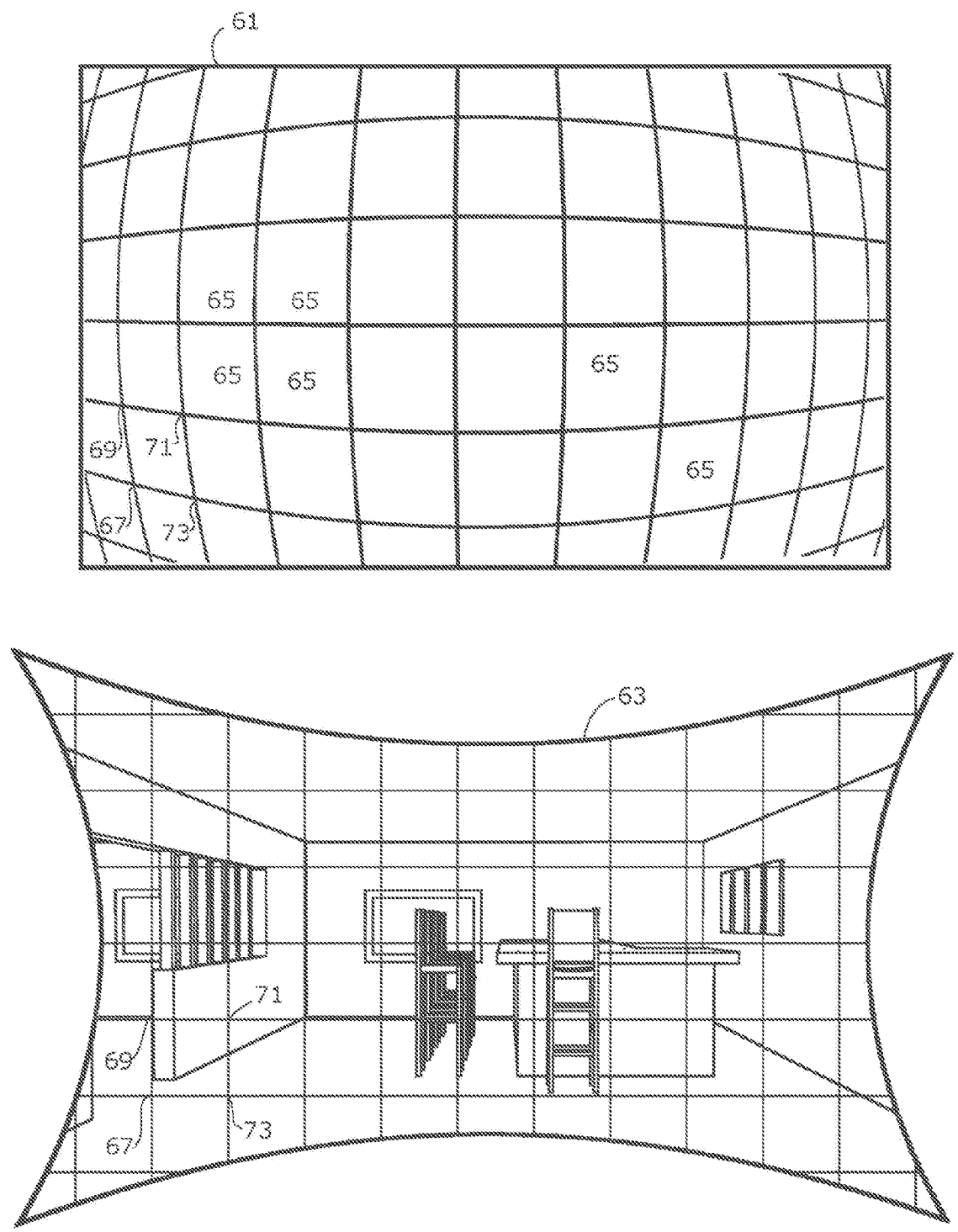
FIGS. 5 and 6 illustrate other transformations of the images of FIG. 2.
Figure 6:
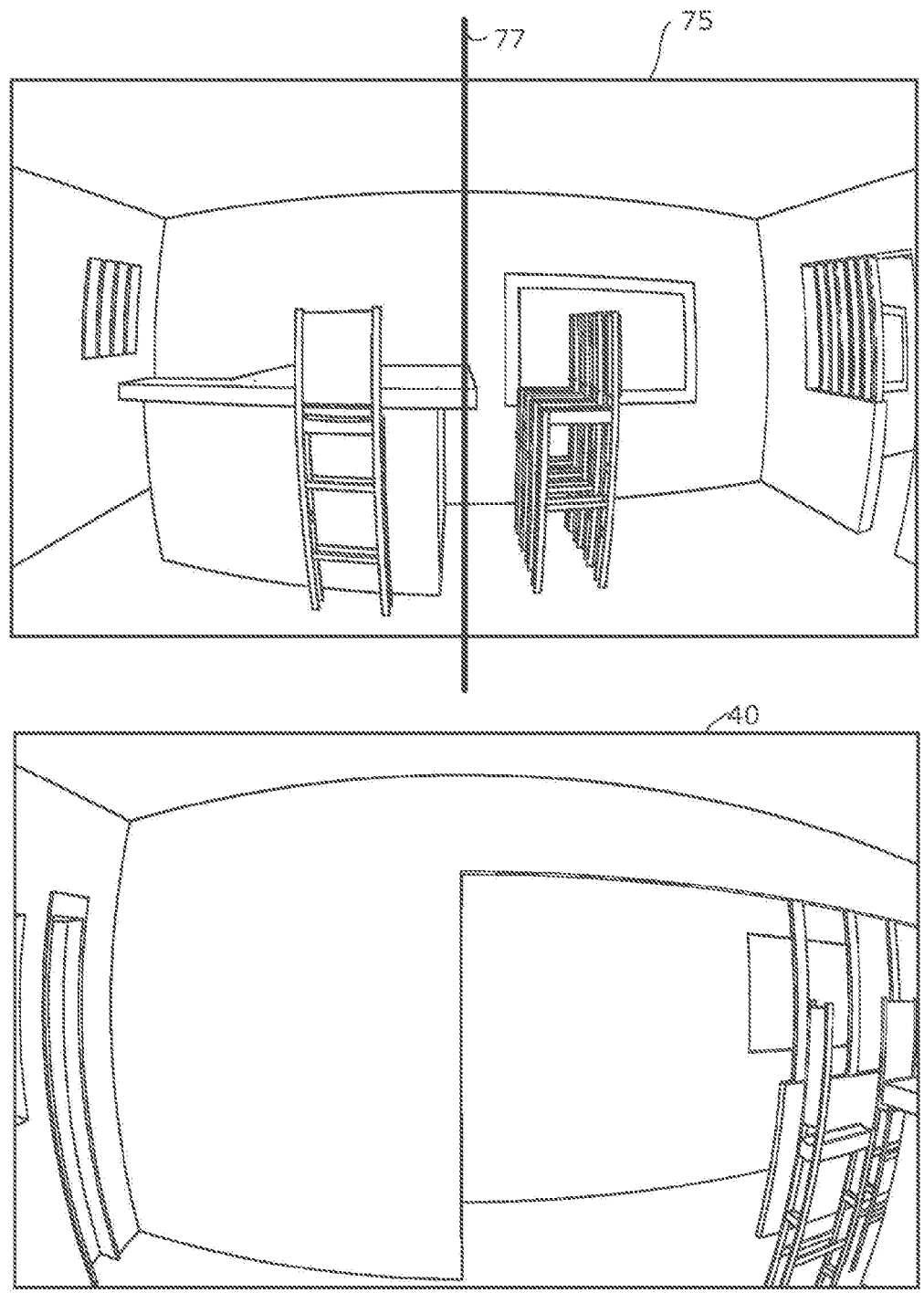

In this embodiment, the transformed images 56 and 58 deviate from a rectilinear representation to an increasing degree from right to left in the case of image 56 and from left to right in the case of image 58. In other embodiments, other transforms may result in more or substantially all of images 56 and 58 appearing as rectilinear representations of the indoor space 10. In some embodiments, the edge regions 60 and 62 may correspond to (for example, be equal to, be proportional to, be a function of, or be offset from) the overlapping region of the fields of view of images 56 and 58 and images 39 and 40, as illustrated by reference numeral 32 in FIG. 1. In some embodiments, substantially all of the edge regions 16 and 62 may be transformed into a rectilinear projection of the indoor space 10, or in other embodiments, a subset of the edge regions 60 and 62 may be transformed approximately to this state. An example of a full-image (or substantially full image) approximately rectilinear transformation is depicted in FIG. 5 and is described further below.

In the illustrated example of FIG. 4, the images 39 and 40 are transformed by applying a barrel-distortion transformation with a center point, or virtual optical axis, that is centered outside of image 39 to the left of image 39, in the direction in which the images 39 and 40 overlap, and the image 40 is transformed into the image 56 by applying a barrel transform that was centered outside of image 40 to the right of image 40, in the direction in which the images 39 and 40 overlap. In some embodiments, the virtual optical axis for barrel-distortion transform may be centered beyond the left or right edge of the images 38 and 40 at approximately the distance between the center of the images 38 and 40 and beginning of the overlapping portion of the images 38 and 40 to approximately counteract the curvature imposed by the lens of the camera 12 in the overlapping regions. As illustrated by the above examples, the transformation may take a variety of different forms that reduced the relative distortion (i.e., differences in the way in which the images are distorted) between the images 56 and 58 output by the edge-region distortion reducer 60.

In other embodiments, the images 56 and 58 may be transformed such that the edge regions 60 and 62 are not rectilinear representations, but are distorted in the same way. For example, the vertical lines 64 and horizontal lines 66 may not appear as straight lines in the edge regions 60 and 62, but a transformation may be selected such that the lines 64 and 66 curve in the same direction at approximately the same places in the lines 64 or 66, such that the features of the edge regions 60 and 62 that depict the same portions of the indoor space 10 (FIG. 1) will approximately line up with one another were the edge regions 60 and 62 overlaid on top of one another. An example of such a non-rectilinear transformation is described below with reference to FIG. 6.

A number of different transformations may be applied to the images 39 and 40. In some embodiments, a model of the lens of the camera 12 (FIG. 1) may be obtained, for example from a manufacturer of the camera, or based on the specifications of the lens, or empirically by, for example, photographing a scene having a known spatial arrangement of features, such as square grid of lines, and measuring the spatial or color distortion in different regions of the photograph relative to the known spatial or color arrangement of features, an example of this technique is described below with reference to FIG. 5.

In some embodiments, the model of the lens may be an estimate of the lens's properties. Some embodiments may model the lens as a radially symmetric object, and the lens may be characterized by an equation or a table that encodes the magnification of the lens as a function of the angular distance between the optical axis of the lens and a feature's position in the field of view of the lens. In some embodiments, for some types of lenses, such as some wide-angle lenses, the magnification may decrease monotonically or substantially monotonically as a function of this angle from the optical axis.

Based on the obtained model, the images 39 and 40 of FIG. 2 may be transformed, for example by calculating a reverse magnification for each of the regions of the images 39 and 40 and enlarging those regions according to the calculated reverse magnification to undo the distortion caused by the lens. For instance, pixels in the input images 39 and 40 may be mapped to pixels in output images by calculating an angle of the pixels in the input images relative to the optical axis of the camera (e.g., based on a distance from a center of the image to the pixels, or radius of the pixels), and identifying corresponding pixels (or a corresponding pixel) in an output image based on the product of the input pixel's position vector from the center of the image and a magnification determined by a model of the lens.

In some embodiments, the transformation may be performed based on calibration images, for example, by a photographing a grid of lines with a camera 12 to calibrate the camera and mapping the intersections of the grid in the resulting image to those in a rectilinear representation of the grid. Images may be transformed between the distorted state and a rectilinear representation based on the mapping. An example of such a transformation is illustrated in FIG. 5, which depicts distorted calibration image 61 and transformed image 63, a transformation of image 39 of FIG. 2. In this example, an array or matrix (e.g., a grid) of the unit shape 65 may be photographed. Each unit shape 65, such as a square or rectangle, may define four points (or some other number, depending on the shape) at each of its corners, and the location of those four points in the distorted calibration image 61 of the grid may be mapped to their location in a rectilinear representation of the grid. For instance each point (such as points 67, 69, 71, and 73 in images 61 and 63) of the grid in the distorted image 61 may be associated with a vector, such as a tuple indicating the number of pixels in a horizontal and vertical direction, corresponding to the displacement of the point between the distorted image 61 captured with the lens and in the rectilinear representation transformed image 63.

In some embodiments, the distortion of images may be reduced based on these displacement vectors. For instance, the images may be transformed by transforming sections of the distorted image defined by the location of four points (e.g., 67, 69, 71, and 73) of a unit shape 65 in a distorted image of the photograph grid based on these vectors. In some embodiments, a set of four points in the distorted image of the grid may define a trapezium, or four-sided region in one of the images 39 or 40 (FIG. 2), for example the same set of pixels in the image 39 and 40 in the distorted image of the grid, and the pixels lying within that trapezium may be transformed, for example linearly, into a rectangle or square in a transformed subsection of the image. The linear transformation may be performed with a variety of techniques, for example a perspective transform may be performed based on the above-described displacement vectors or a perspective transform may be approximated with an affine transform in instances in which computing power or time is a significant constraint. This process may be repeated for each unit 65 of the grid, and the output rectangular subsections of the image may be combined in the output image 63 with reduced distortion. In some embodiments, the calibration grid may have some other unit shape, such as a triangle or hexagon, for example.

In another example, the images may be transformed to have similar distortion without necessarily transforming the overlapping portions to a rectilinear representation. For instance, in FIG. 6, an image 75 is formed by transforming the image 39 such that the edge region 46 of image 39 (FIG. 2) has a similar distortion to the overlapping edge region 44 of image 40. In this example, image 39 is transformed by reversing the horizontal position of pixels relative to a central vertical axis 77. For example, a pixel that is 100 pixels to the right of the axis 77 pre-transformation is mapped to a position 100 pixels to the left of the axis 77 by the transformation. In some embodiments, image 77 is a horizontal reflection of the image 39 (FIG. 2). As a result of this transformation, features in the images 40 and 75 are similarly distorted, e.g., matching vertical features are curved in the same direction in the two images. This is an example of a pixel position inversion transformation.

Many of the above-described distortions and transforms are spatial distortions and spatial transforms, but additionally or alternatively, other embodiments may include other types of distortions and other types of transforms, for example, color transformations and color distortions or brightness transformations and brightness distortions. The transforms may, in some embodiments, reduce the relative distortion of features appearing in images captured in different directions, which as explained below, may facilitate feature matching between the images.

Figure 7:
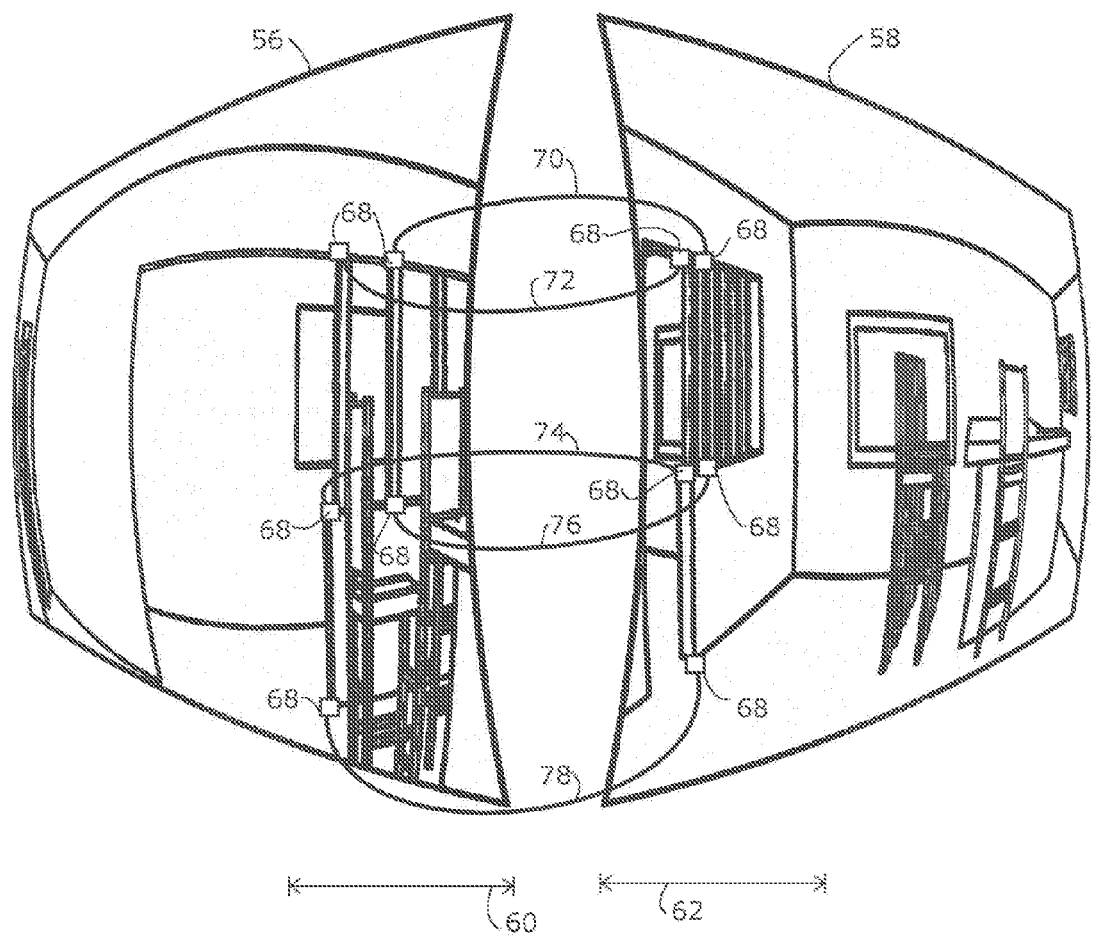
FIG. 7 illustrates matched features in the transformed images of FIG. 4.

As mentioned above, the matcher 62 (FIG. 3) may match features appearing in the images 56 and 58, for example features appearing in the overlapping edge regions 60 and 62, as illustrated by FIG. 7. The accuracy of the matches may be enhanced by the above described process for reducing the distortion in the edge regions 60 and 62 of the images 56 and 58.

In FIG. 7, features that are matched are identified by square boxes 68, and the matching feature in each of the images 56 and 58 is identified by curved lines 70, 72, 74, 76, and 78. In this example, relatively few matches are illustrated in order to avoid cluttering the figure, but in other embodiments, substantially more, for example a hundred, a thousand, ten thousand, or more features may be matched.

The features may be matched with a variety of techniques. For example, features may be matched by detecting edges in the images 56 and 58, and edges having similar shapes or similar spatial relationships with other edges in each of the images 56 and 58 may be identified as matches. In some embodiments, edges may be detected based on a gradient, such as a color or brightness gradient of the pixels or sub-pixels in each of the images 56 and 58. For example, an edge may be detected in response to the rate of change of intensity as a function of pixel position exceeding a threshold gradient, as typically occurs near an edge in which a light region borders a dark region. For instance, edges may be detected based on the Canny edge-detection algorithm. In some embodiments, edges may be detected based on a first order image gradient (or first derivative of intensity as a function of pixel position) or based on a second order image gradient (or rate of change of the first order gradient as a function of position). Other embodiments may detect edges based on other attributes of an image, such as edge detection based on phase-congruency techniques. In some embodiments, feature points or areas, such as corners defined by intersecting edges or ends of edges, may be matched. A variety of techniques may be used to detect and match features. Features may be detected by executing the speeded up robust feature (SURF) detection algorithm. Alternatively, or additionally, features may be detected by executing the scale-invariant feature transform (SIFT) algorithm.

The matches 70, 72, 74, 76, and 78 may be stored in memory in a variety of different formats. For example, each match may be characterized by match data that, in some embodiments, includes a feature identifier or a match identifier (e.g., an number incremented with each match) and a vector associated with image 56 identifying the location of the matching feature in image 56 and a vector associated with image 58 identifying the location of the feature in image 58, for example a tuple having a number of pixels from an origin, such as in upper left corner, in a vertical and in a horizontal direction, in the image 58. The match data may also include a confidence indicator indicating the strength of the match, which may be based on the degree to which the locations, spatial relationships, or other attributes of the match features correspond to one another. In some embodiments, the match data may alternatively or additionally indicate the location of the matching features in other images, such as in the input images 39 and 40 or in a panorama based on the images 39 and 40. The vectors or other location data for the matches in FIG. 7 may be translated to vectors in the coordinate space of the other figures by reversing the transformation described above and applying the reverse transformation to the location vectors for the matches in the images of FIG. 7.

In some embodiments, the above-describes process for transforming images into images having reduced distortion in their edge regions and matching features may be repeated for multiple pairs of images captured in the same two orientations. For example, as noted above, some embodiments may capture multiple images at different exposure settings in each of the directions 16, 18, 20, 22 (FIG. 1). For a given exposure setting, the above-described processes may be repeated for each pair of images at that exposure setting, for example, neighboring pairs of images at a lowest exposure setting may be transformed and matched, and then, neighboring pairs of images at a higher exposure setting may be transformed and matched. In some embodiments, matches at one exposure setting may be identified based on the presence of matches identified at a different exposure setting, for example the confidence indicated by the data described above may be increased or a marginal match may be identified as a match based on the presence of a match at a different exposure setting. Identifying matches based on the location of matches in images having a different exposure time is expected to yield more accurate matches across a set of images captured at different exposure settings in one position.

Further, the above-describe processes of transforming and matching may be repeated for each pair of neighboring images. For example, the process described above may be repeated for the pair of images captured in directions 18 and 20, the pair of images captured in directions 20 and 22, and the pair of images captured in directions 22 and 16. The images and the match data may be stored as matched panoramas or matched images in memory, for example in the feature-match repository 64 of FIG. 3. In some embodiments, the multiple images captured at different exposure settings in a given direction may be combined with one another in a high-dynamic range image, or image having a larger dynamic range than that of the image sensor of the camera 12, and the high-dynamic range image may be stored in the feature-match repository 60 and associated with the corresponding matches. In some embodiments, alternatively or additionally, features may be matched in the high-dynamic range image.

Further, in some embodiments, the images, or the high-dynamic range images may be stitched to one another based on the matches to form a panorama of the indoor space 10. In some embodiments, the images may be stitched by transforming and spatially aligning the images such that matched features in neighboring images are overlaid and cropping each of the images at a boundary defined by lines intersecting the matched features. The images may be matched side-to-side with neighboring images, and in some embodiments, top-to-bottom with neighboring images captured at a higher or lower angle of the optical axis of the camera 12 relative to one another. The matches provided by the techniques described herein are expected to yield more accurate stitching, e.g., stitching that yields fewer artifacts of the stitching process, such as discontinuities of features in the images at the stitching boundary, relative to systems using other techniques. However, as with the other benefits described here, not all embodiments provide this benefit, and other techniques may provide other benefits, as various tradeoffs may be made in implementations, such embodiments that accept less accurate matching in exchange for matching obtained with less computing time or user effort than that required for traditional techniques.

In addition to stitching the images, the matches may be used for a variety of other purposes. For example, as discussed above, attributes of the lens of the camera 12 may be determined based on the different location of matches in different images captured at different orientations. In some embodiments, the attributes of the lens of the camera may be estimated based on differences in locations of matching features between images at different orientations, and the above-described process of edge-read region distortion reduction and matching may be repeated by reducing distortion based on the estimated lens properties.

Figure 8:
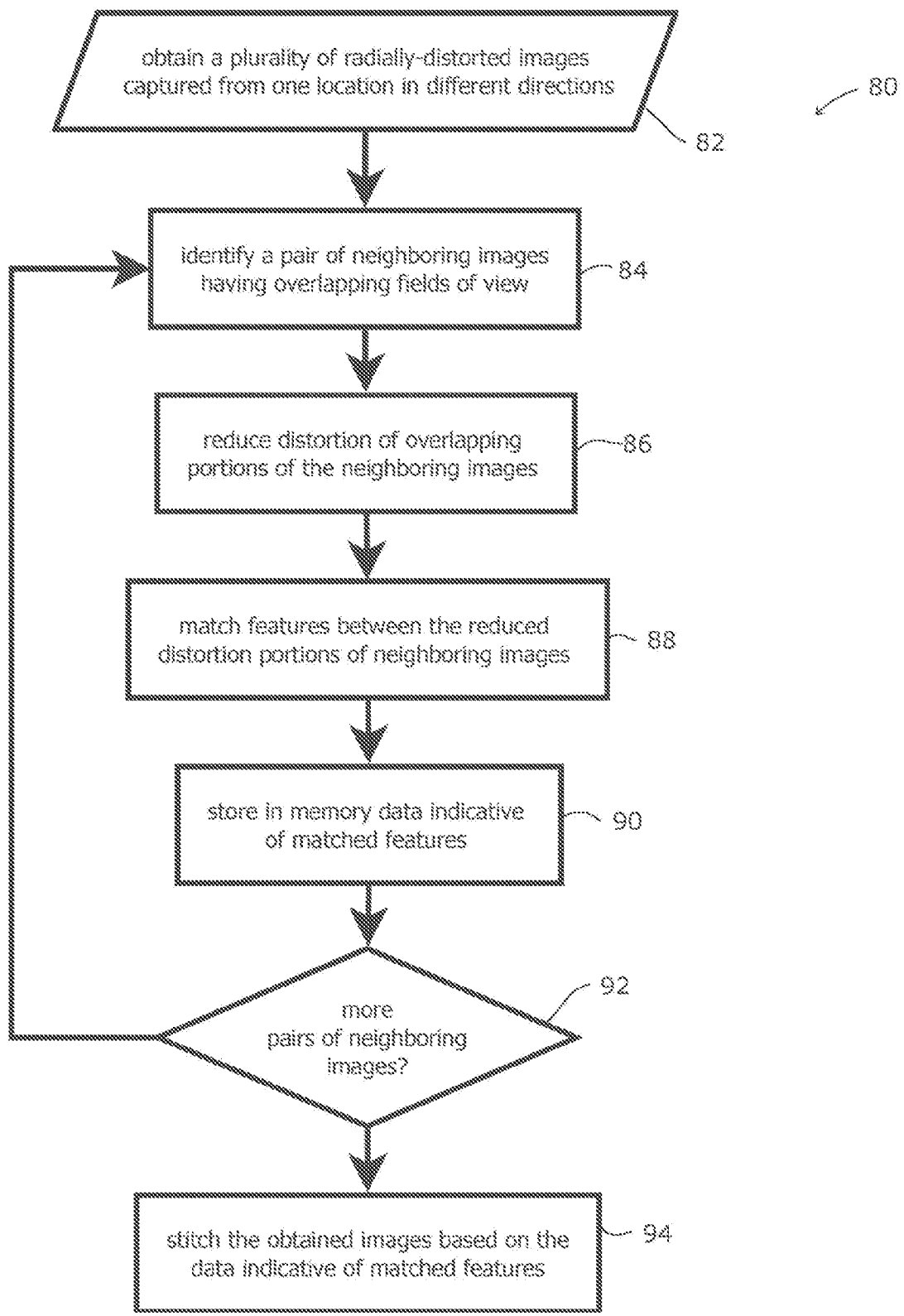
FIG. 8 illustrates an embodiment of a method of matching features in distorted images.

FIG. 8 illustrates an example of a matching process 80, which may be performed by the above-described image-feature matcher 14 or with other devices configured to match features in distorted images. The process of this embodiment 80 begins with obtaining a plurality of radially-distorted images captured from one location in different directions, as indicated by block 82. The images may be obtained with a variety of techniques, for example the images may be received via a wireless connection, via a wired connection, or by reading the images from a machine-readable non-transitory tangible medium, such as various forms of memory. The images may be obtained, for example, from the above-described camera 12 (FIG. 1), and in some embodiments, the images may be received in the image-intake module 56 described with reference to FIG. 3. In other embodiments, the images may be obtained from different locations and have overlapping regions.

Next, a pair of neighboring images having overlapping fields of view may be identified, as indicated by block 84. This step, in some embodiments, may be performed by the neighboring-image selector 58 described above with reference to FIG. 3. Identifying pairs of neighboring images may include associating each image obtained in step 82 with two different pairs of images, one pair including the image to the left of a given image, or counterclockwise of the given image, and the other pair including the image to the right, or clockwise direction of the given image.

Next, in this embodiment, distortion of overlapping portions of the neighboring images may be reduced, as illustrated by block 86. Reducing distortion may include reducing spatial, color, brightness, or other forms of distortion and may be performed by the edge-region distortion reducer 60 described above with reference to FIG. 3, for instance. In some embodiments, the relative distortion of the images may be reduced such that the images remain distorted, but the differences in the way in which the images are distorted are reduced, a transformation that includes decreasing the distortion of the images, but also includes other transformations.

Next, features may be matched between the reduced distortion portions of the neighboring images, as illustrated by block 88. Matching, in some embodiments, may be performed by the matcher module 62 described above with reference to FIG. 3. Feature matching may include detecting edges and identifying edges having similar attributes between the two images. In some embodiments, edges may be detected based on a first order or a second order image gradient, as described above. In some instances, edges or other features may be detected in sub-channels of an image, for example based on intensity in a red sub-channel, intensity in a blue sub-channel, or intensity in a green sub-channel, and the detected edges or matched features may be combined, for instance a feature may be matched when two or more of the sub-channels identify a given match or one of the sub channels identifies a match having a particular confidence indicator. In some embodiments, the image may be converted to a gray-scale image, and edges may be detected based on the intensity of pixels. Or the image may be converted into a black-and-white image, and edges or other features may be detected based on the boundaries between black regions and white regions.

Data indicative of the detected matches may be stored in memory, as indicated by block 90. The data indicative of detected matches may include the above-described match data discussed with reference to FIG. 7, and the match data may be stored in the feature-match repository 64 described above with reference to FIG. 3, in some embodiments. The data indicative of matched features may also include or be a count of matched features or a subset of the match features.

Next, the process 80 determines whether there are more pairs of neighboring images among those images obtained in step 82, as indicated by decision block 92. Upon determining that there are more pairs of neighboring images, in response (for example solely in response to this determination, or in response to this determination and other factors obtaining), the process 80 returns to block 84 and another pair of neighboring images is identified. Upon determining that there are no more pairs of neighboring images, in response, the process 80 proceeds to block 94, and the obtained images are stitched together based on the data indicative of matched features. In some embodiments, the images are not stitched, and the matched features are used for other purposes, which is not to suggest that any other feature described herein may not also be omitted in some embodiments.

As noted above, some of the techniques described herein match images appearing in differently distorted regions of images. Reducing the relative distortion of overlapping regions of images is expected to result in more matched features and more accurate identification of matched features in some applications. For example, more accurate and more matched features (relative to those obtained with conventional techniques) may be used to stitch images together with fewer artifacts and to more accurately characterize the lens with which the images were captures.

Figure 9:
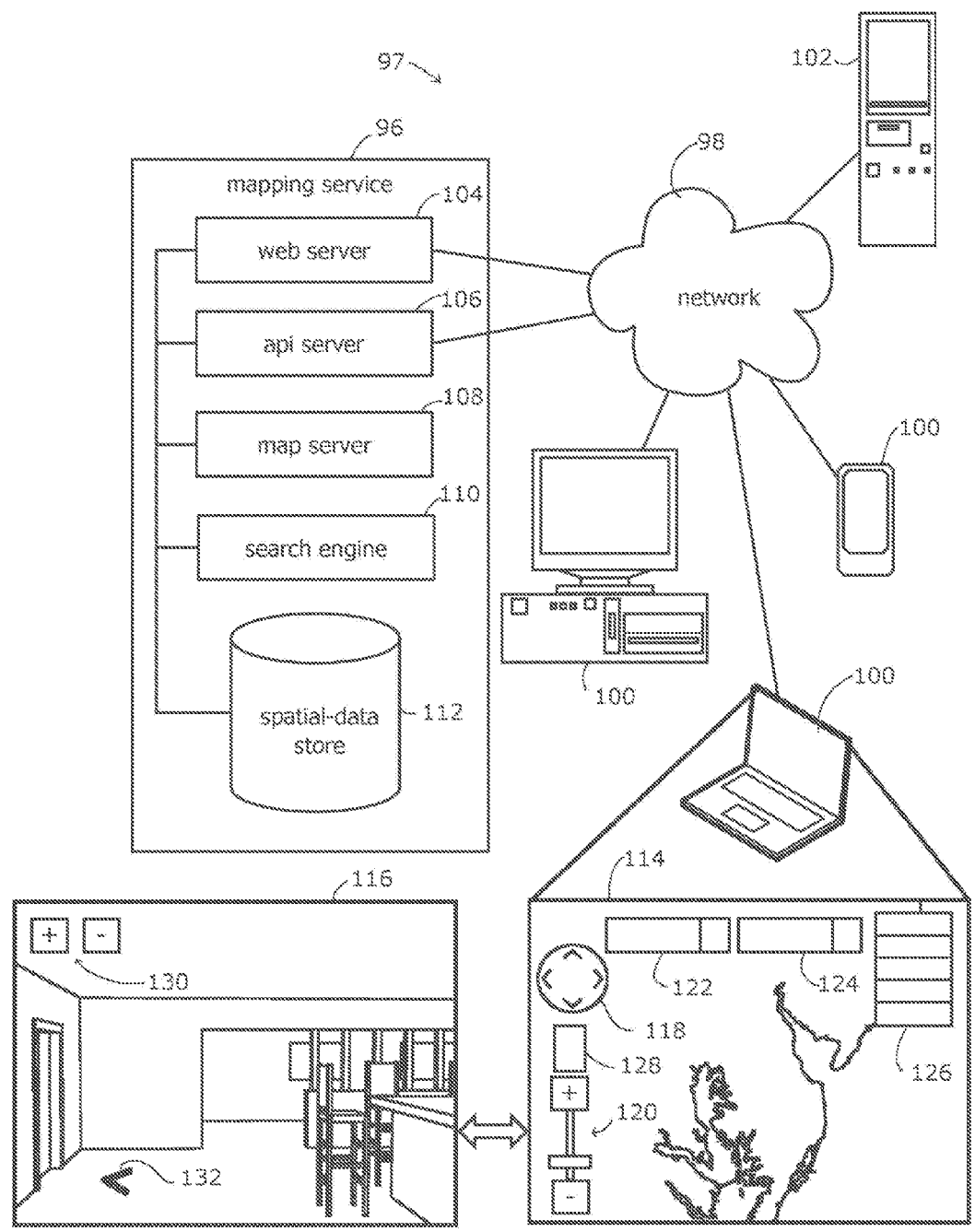
FIG. 9 illustrates an embodiment of a mapping service.

In some embodiments in which the stitched panoramas are formed based on the matches, the panoramas may be accessed and viewed by users of a geographic information service (GIS) or a mapping service, an example of which is the mapping service 96 illustrated in FIG. 9. The illustrated mapping service 96 is part of a computing system 97 including the mapping service 96, a network 98, user devices 100, and a web server 102. As explained below, the mapping service 96 may display interactive maps to users, who may interact with the maps to select and view panoramas, such as the panoramas formed in accordance with the techniques described above and provided by a panorama-providing service of the mapping service 96. Or in some embodiments, the mapping service 96 may be a panorama-providing service without the capacity to provide maps, which is not to suggest that any other feature described herein may not also be omitted.

In some embodiments, the illustrated computing system 97 may be a geographically distributed computing system. For example, mapping service 96 may be remote from client devices 100, both of which may be remote from web server 102. In other embodiments, one or more of these components 96, 102, and 100 may be located in the same place (e.g., a shared local-area network or physical building) or integrated into a single computing device. In some embodiments, each of the components 96, 102, and 100 of the computing system 97 may include one or more computing devices, such as one or more of the examples of computing devices described below with reference to FIG. 10, and the components 96, 102, and 100 may serve different roles in different embodiments and different use cases: for example the mapping service 96 may operate as a server and the devices 102 and 100 may operate as clients of the server 96, or in some use cases or embodiments, the components 96, 100, and 102 may operate as peers in a peer-to-peer architecture.

In this embodiment, the components of the computing system 97 are connected by network 98, which in some embodiments may include the Internet. The network 98 may also include intermediary networks, such as local-area networks, wireless-area networks, cellular networks, and the like. Further, in some embodiments, communication over the network 98 may include communication via intermediary devices, such as servers that cache content, such as webpages depicting maps or portions of panoramas, for expedited delivery to user devices 100, and intermediary devices that pre-render portions of content for user devices 100, e.g., by re-sizing images based on a display on user devices 100 or constructing portions of a document-object model, a style tree, a rule tree, a context tree, or a render tree based on the communicated content for the user device 100.

In this embodiment, the mapping service 96 includes a web server 104, an application program interface (API) server 106, a map server 108, a search engine 110, and a spatial-data store 112.

The mapping service 96 may be a computing system, such as a computing system having one or more computing devices connected to one another over a network. The illustrated functional blocks 104, 106, 108, 110, and 112 may be embodied in whole or in part at hardware, for example as a field programmable gate array or an application-specific integrated circuit, or in whole or in part as software executing one or more processes that provide some or all of the functionality described herein, and such software may be stored on a non-transitory tangible-machine readable medium, examples of which are described below with reference to FIG. 10. In this embodiment, the functional blocks 104, 106, 108, 110, and 112 are described as discrete and separate functional blocks, but in some embodiments, structures or code by which these blocks are implemented may be intermingled or otherwise organized in different groupings than those illustrated.

In some embodiments, the web server 104 may be operable to receive requests for webpages, transmit requests for content to construct the requested pages, received the requested content, and transmit the webpages including requested content to the requesting device via the network 98. For example, the web server 104 may listen to a Transmission Control Protocol/Internet Protocol (TCP/IP) port connected to the network 98 at an Internet Protocol (IP) address of the network 98 and detect a request for a webpage, such as a webpage depicting a map, from one of the users devices 100. The web server 104 may also be operative to maintain a plurality of sessions, such as one session with each of the user devices 100 occurring over overlapping periods of time, in which a user interacts with a requested interactive map webpage on one of the user devices 100. For instance, the web server 104 may store state data indicative of the state of a session or receive such state data from the user devices 100 and receive data indicative of user interactions with an interactive map and change the state data in response to the user interactions. In some embodiments, the web server 104 may transmit a request for map data to the map server 108 or the spatial-data store 112 in response to a request for a webpage or in response to receipt of data indicative of user interactions with the webpage, e.g., user commands requesting a different view. Further, in some embodiments, the web server 104 may receive user search queries and transmit those search queries to search engine 110 to request searches based on the queries. The web server 104 may receive content responsive to these requests, encode the received content in a webpage or content for a webpage, and transmit the encoded data to the user devices 100 or the web server 102.

In some embodiments, the API server 106 may also receive requests for content and, in response, request other components of the mapping service 96 to obtain the requested content, which the API server 106 may transmit to a requesting user device 100 or the web server 102. In some embodiments, the API server 106 may be operable to provide content upon which other webpages are based, such as webpages served by the web server 102, or provide content upon which a display is based in a special-purpose application, such as a mapping application, a navigation application, a social networking application, or other application, which may operate outside of a web browser.

The illustrated map server 108 may be operable to receive requests for map data from the web server 104 or the API server 106 and, in response, obtain the map data from the spatial-data store 112 and transmit the obtain map data to the requesting web server 104 or the API server 106. Examples of such map data are described below with reference to a user interface operating on the user devices 100.

Similarly, the search engine 110 may be operable to receive search queries from the web server 104 or the API server 106, identify content responsive to the query, and transmit the identified content (which may also include transmitting a pointer to the content, such as a uniform resource identifier (URI)) to the requesting web server 104 or API server 106.

The spatial-data store 112 may store a variety of different types of data relating to geographically distributed objects, such as roads, buildings, rivers, lakes, mountains, political boundaries, and the like. For example, the spatial-data store may include images of geographically distributed objects, and images may be associated with metadata indicating the geographic area to which the image pertains such that images of adjacent geographic areas can be displayed adjacent one another to depict a larger geographic area than that depicting either one of the images being combined. In some embodiments, the stored images may depict the same geographic area at different resolutions or granularity, which may also be reflected by the metadata such that a resolution can be selected. The spatial-data store may also include data describing attributes of geographically distributed objects. For example, the data describing such attributes may include traffic data describing the conditions of roads; weather data describing the weather, weather forecast, or past weather in geographic areas; social networking data describing the location of members of adjacent nodes of a social graph and their relationship or other attributes; business listings describing attributes of geographically distributed businesses; and the like. The spatial-data store 112 may be operable to receive requests for data stored within the spatial-data store 112 from the other components of the mapping service 96 and transmit the requested data to the requesting component.

In some embodiments, the spatial-data store 112 may store images depicting different views of geographic areas. For example, the spatial-data store may include images depicting a satellite-view of the geographic area, a birds-eye level view of a geographic area (for example images acquired from an airplane), and an eye-level view of geographic areas (for example images acquired from a camera mounted to a structure on the ground, such as a ground-based vehicle, a person, or a tripod). In some embodiments, one or more of these views may include images stitched to one another with the above-described techniques. For example, panoramas may be captured from an eye-level view, and the images from the panoramas may be stitched to one another to form images stored in the spatial-data store 112, which in some embodiments may receive those images from the above-described feature-match repository 64 (FIG. 3). The stitched images may include images from a single position in different directions stitched to one another or images from different positions with overlapping fields of view stitched to one another, for instance.

In some embodiments, the illustrated web server 102 may be operable to serve webpages to the user devices 100, and the webpages may include content from the mapping service 96. In some embodiments, the web server 102 may receive a request for a webpage or other content from a user device 100 and, in response, may construct the requested webpage by requesting content for the webpage from the mapping service 96 via either the web server 104 or the API server 106. In some embodiments, the web server 102 may be operable to serve a webpage to the user devices 100 that includes a request for content from the mapping service 96, and the user device 100 may request this content from the mapping service 96.

The illustrated user devices 100 may be a non-portable device, such as a desktop computer, a gaming console, or a set-top box, or a portable device, such as a laptop, a tablet computer, or a smart phone, each of which may include a power source (e.g., a battery or fuel cell) for off-grid operation. In this embodiment, each of the user devices 100 are connected to the network 98 and include a display, a processor, and memory. In some embodiments, the user devices 100 may be one of the computing devices described below with reference to FIG. 10. The user devices 100 may include an operating system and a web browser that are stored in memory and executed on a processor of the user devices 100 or an application that uses data from the mapping service 96 that is stored in memory and executed by the processors of the user devices 100.

Examples of interactive maps that may be displayed by the user devices 100 are illustrated by user interfaces 114 and 116. The user interfaces 114 and 116 may be displayed on a display of the user devices 100 and, in some embodiments, may be interactive. For example, interface 114 illustrates an example of an interactive map. The interactive map of interface 114 may be rendered by a browser of the user devices 100 or may be displayed by a special-purpose application. In this embodiment, the interface 114 is operable to display a map of a geographic area and receive user interaction commands by which the user requests to view different geographic areas, a subset of the depicted geographic area at a higher resolution or different view, or information about geographically distributed objects.

Users may interact with the interface 114 through a variety of techniques, for example in some embodiments users may click on areas of the map with a mouse, click and drag areas of the map with a mouse, enter text commands with a keyboard, enter verbal commands with a microphone processed by voice recognition, or touch and drag on a single-touch or multi-touch surface of the display to enter commands.

The illustrated interface 114 depict a plan view of a geographic area, for example a satellite view. The interface 114 includes panning commands 118 by which a user may command the interactive map to pan to the East, West, North, or South, and a zoom interface 120 by which a user may move a slider or click buttons to change the extent of the map depicted in the user interface 114. In this embodiment, a search interface 122 may receive text or spoken search requests by a user, for example search queries relating to geographically distributed objects, and a navigation interface 124 may receive text or spoken navigation requests by which a user may request a route between different geographic areas, for example a route for a particular mode of transport, such as by walking, by bicycle, bike car, or by train. A layer interface 126 may receive user requests to overlay the map of the interface 114 with map data, such as traffic data, weather data, photographs, social-networking data, and the like. A view selector interface 128 may receive user requests to view a different view of a geographic area within the interactive map interface 114. For example, a user may click on the view selector interface 128 and drag the view selector interface 128 to a region of the illustrated map in which the user would like to view an eye-level view. In response, the user device 100 may receive the request from the user, transmit a request for an eye-level view to the mapping service 96, received an eye-level view interface 116 from the mapping service 96, and display the eye-level view interface 116.

The illustrated eye-level view interface 116 is an interactive eye-level view based upon the images captured and processed with the above-described techniques and stored in the spatial-data store 112. In some embodiments, a user may interact with the interface 116 by clicking, dragging, pressing a button, or otherwise indicating that a user wishes to view within the interface 116 an image of a different direction from a given position, and in response, the user device 100 may display an image in the requested direction, such as an image formed with the above-described stitching process. In some embodiments, images for adjacent directions may be stored in cache in the user device 100, or the user device 100 may request the images corresponding to the selected view from the mapping service 100, for example via the API server 106 or the web server 104. The interface 116 further includes zoom interface 130 by which a user may request to zoom in or out of the image depicted by the interface 116, and a repositioning interface 132 by which a user may request images captured from a different position, for example images within a panorama captured from a different position and stored and processed in accordance with the above-describe techniques.

As discussed above, the images presented within the interface 116 may be relatively accurately stitched together, for example with relatively few stitching artifacts, in virtue of some of the above-describe techniques. It should be noted, however, that not all embodiments use the above-describe techniques for the purpose of providing data to a mapping service or for the purpose of stitching images.

In some embodiments, in the course of, as a precondition to, or upon providing panoramas, the map server 108 may be operable to itself, or in combination with another device, determine at least one of the following: whether a user associated with one or more of the user devices 100 has subscribed to a panorama-providing service (e.g., to a service at least partially provided by the map server 108); whether a user associated with one or more of the user devices 100 has a license to view images from the panorama-providing service; or an advertisement to be transmitted to the a user associated with one or more of the user devices 100 based on the requested at least a portion of the panorama. Performing this determination may reduce labor costs associated with generating revenue based on use of the map server, as performing these determinations manually is often time consuming and relatively slow.

Figure 10:
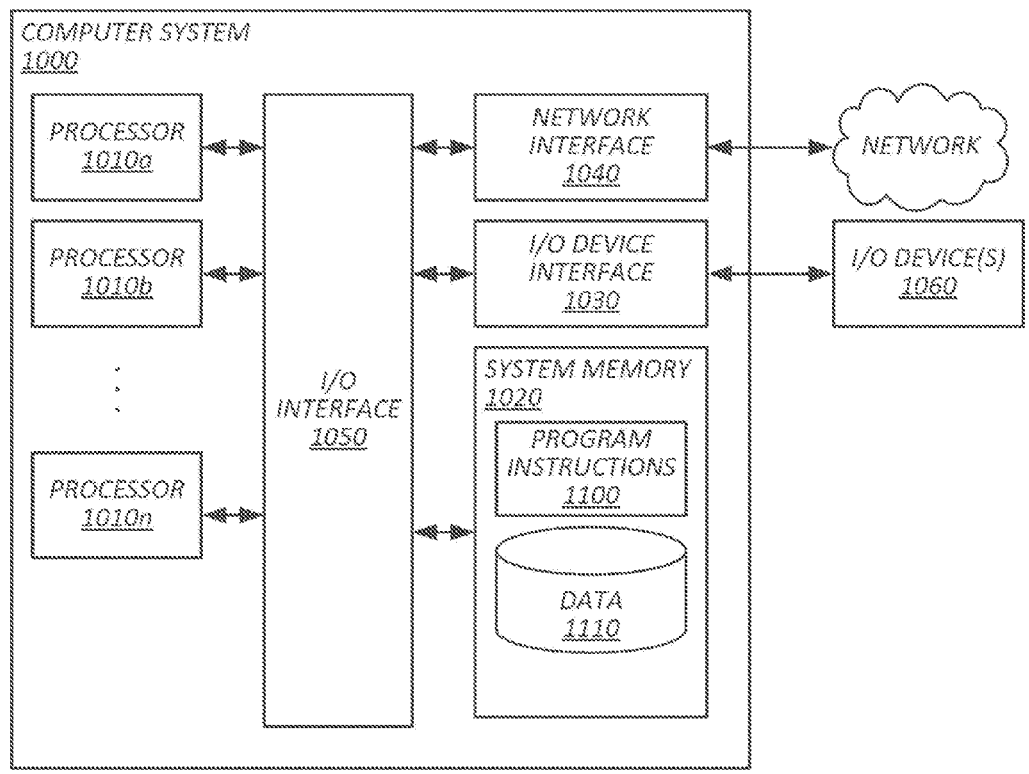
FIG. 10 illustrates an embodiment of a computing device.

FIG. 10 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010*a*-1010*n*, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" or "a element" includes a combination of two or more elements. The term "or" is, unless indicated otherwise, non-exclusive, i.e., encompassing both "and" and "xor". Terms relating to causal relationships, e.g., "in response to," "upon," "when," and the like, encompass both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A method, comprising:
   obtaining, by one or more computing devices, a plurality of radially-distorted images captured from one location in different directions, the plurality of images each having a field of view, and neighboring images among the plurality of images having overlapping fields of view;
   reducing, by the one or more computing devices, relative distortion of portions of the neighboring images in the overlapping fields of view of the neighboring images by warping the portions of the neighboring images in the overlapping fields of view of the neighboring images by barrel transforming the portions of the neighboring images in the overlapping fields of view of the neighboring images, the barrel transforms being centered beyond the field of view of the neighboring images in opposite directions for each of the neighboring images;

matching, by the one or more computing devices, features between the reduced distortion portions of neighboring images in the overlapping fields of view; and storing, by the one or more computing devices, in memory data indicative of the matched features.

2. The method of claim 1 wherein warping the portions of the neighboring images in the overlapping fields of view of the neighboring images comprises:

warping the portions of the neighboring images in the overlapping fields of view of the neighboring images based on a fisheye lens model.

3. The method of claim 1 wherein reducing relative distortion of portions of neighboring images in the overlapping fields of view comprises:

applying a first transform configured to reduce distortion in a left portion of one image among the neighboring images; and applying a second transform configured to reduce distortion in a right portion of another image among the neighboring images.

4. The method of claim 1 wherein matching features between the reduced distortion portions of neighboring images in the overlapping fields of view comprises:

detecting corners of edges in the reduced distortion portions of neighboring images in the overlapping fields of view; and comparing corners of edges detected in the reduced distortion portions of one neighboring image with corners of edges detected in the reduced distortion portions of another neighboring image next to the one neighboring image.

5. The method of claim 4 wherein detecting corners of edges in the reduced distortion portions of neighboring images in the overlapping fields of view comprises:

determining image gradients of pixels in the reduced distortion portions of neighboring images; and determining whether the image gradients are greater than a gradient threshold.

6. The method of claim 5 wherein the image gradients are first order image gradients.

7. The method of claim 5 wherein the image gradients are second order image gradients.

8. The method of claim 1 wherein reducing relative distortion of portions of the neighboring images in the overlapping fields of view of the neighboring images comprises reducing relative distortion of non-overlapping portions of the neighboring images.

9. The method of claim 1 wherein reducing relative distortion of portions of the neighboring images in the overlapping fields of view of the neighboring images comprises reducing distortion of neighboring images relative to a rectilinear representation of the neighboring images.

10. The method of claim 1 wherein reducing relative distortion of portions of the neighboring images in the overlapping fields of view of the neighboring images comprises inverting the positions of pixels of one of the neighboring images.

11. The method of claim 1 wherein reducing relative distortion of portions of the neighboring images in the overlapping fields of view of the neighboring images comprises transforming each of a plurality of trapezium-shaped regions of the neighboring images to a rectangular-shaped region.

12. The method claim 1 comprising:

forming a panorama by stitching portions of the neighboring images to one another based on the data indicative of matched features; and storing the panorama in memory.

13. The method of claim 12 wherein forming a panorama by stitching portions of the neighboring images to one another based on the data indicative of matched features comprises: positioning the neighboring images relative to one another by aligning matching features in the neighboring images with one another.

14. The method of claim 12 comprising:

receiving a request from a computing device for at least a portion of the panorama; and retrieving the requested at least a portion of the panorama from memory; and transmitting the retrieved at least a portion of the panorama to the computing device.

15. The method of claim 14 comprising:

determining at least one of the following: whether a user associated with the computing device has subscribed to a panorama-providing service; whether a user associated with the computing device has a license to view images from the panorama-providing service; or an advertisement to be transmitted to the user based on the requested at least a portion of the panorama.

16. The method of claim 1 wherein warping the portions of the neighboring images in the overlapping fields of view of the neighboring images comprises:

warping the portions of the neighboring images in the overlapping fields of view of the neighboring images based on a fisheye lens model;

wherein matching features between the reduced distortion portions of neighboring images in the overlapping fields of view comprises:

detecting edges in the reduced distortion portions of neighboring images in the overlapping fields of view based on image gradients of pixels in the reduced distortion portions of neighboring images; and comparing edges detected in the reduced distortion portions of one neighboring image with edges detected in the reduced distortion portions of another neighboring image next to the one neighboring image.

17. A non-transitory tangible machine-readable medium having a computer program product stored thereon that causes a computer system to effect a process comprising the following:

obtaining a plurality of radially-distorted images captured from one location in different directions, the plurality of images each having a field of view, and neighboring images among the plurality of images having overlapping fields of view;

reducing relative distortion of portions of the neighboring images in the overlapping fields of view of the neighboring images by warping the portions of the neighboring images in the overlapping fields of view of the neighboring images by barrel transforming the portions of the neighboring images in the overlapping fields of view of the neighboring images, the barrel transforms being centered beyond the field of view of the neighboring images in opposite directions for each of the neighboring images;

matching features between the reduced distortion portions of neighboring images in the overlapping fields of view; and storing in memory data indicative of the matched features.

18. A system, comprising:

one or more processors;

one or more memories communicatively coupled to the one or more processors and storing instructions that when executed by one or more of the one or more processors cause a process comprising the following to occur:

obtaining a plurality of radially-distorted images captured from one location in different directions, the plurality of images each having a field of view, and neighboring images among the plurality of images having overlapping fields of view;

reducing relative distortion of portions of the neighboring images in the overlapping fields of view of the neighboring images by warping the portions of the neighboring images in the overlapping fields of view of the neighboring images by barrel transforming the portions of the neighboring images in the overlapping fields of view of the neighboring images, the barrel transforms being centered beyond the field of view of the neighboring images in opposite directions for each of the neighboring images;

matching features between the reduced distortion portions of neighboring images in the overlapping fields of view; and storing in memory data indicative of the matched features.

19. The system of claim 18 wherein matching features between the reduced distortion portions of neighboring images in the overlapping fields of view comprises:

detecting corners of edges in the reduced distortion portions of neighboring images in the overlapping fields of view; and comparing corners of edges detected in the reduced distortion portions of one neighboring image with corners of edges detected in the reduced distortion portions of another neighboring image next to the one neighboring image.

20. The system of claim 19 wherein detecting corners of edges in the reduced distortion portions of neighboring images in the overlapping fields of view comprises:

determining image gradients of pixels in the reduced distortion portions of neighboring images; and determining whether the image gradients are greater than a gradient threshold.

\* \* \* \* \*